United States Patent [19]

Albertassi et al.

[11] 4,347,142
[45] Aug. 31, 1982

[54] EFFLUENT TREATMENT IN A NON-POLLUTING TOILET SYSTEM

[75] Inventors: James H. Albertassi, West Falmouth, Mass.; Walter O. Heinze, Swarthmore, Pa.; Aaron Landsman, Buzzards Bay, Mass.

[73] Assignee: International Water Saving Systems, Inc., New York, N.Y.

[21] Appl. No.: 219,242

[22] Filed: Dec. 22, 1980

Related U.S. Application Data

[63] Continuation of Ser. No. 37,655, May 11, 1979, abandoned, and a continuation-in-part of Ser. No. 939,992, Sep. 6, 1978, abandoned.

[51] Int. Cl.$^3$ .............................................. C02F 1/76
[52] U.S. Cl. ................................. 210/756; 4/DIG. 9; 210/765; 210/794; 210/173
[58] Field of Search ................. 4/318, 319, DIG. 9; 210/616–618, 754–756, 764, 765, 794, 805, 139, 167, 173, 195.1, 202, 206, 260, 290

[56] References Cited

U.S. PATENT DOCUMENTS

| | | | |
|---|---|---|---|
| 3,440,669 | 4/1969 | Boester | 4/DIG. 9 |
| 3,451,552 | 6/1969 | Carlson | 210/202 |
| 3,471,025 | 10/1969 | Dobson | 210/290 |
| 3,786,922 | 1/1974 | Materese | 210/202 |
| 3,824,632 | 7/1974 | Bach et al. | 4/318 |
| 3,974,528 | 8/1976 | Claunch et al. | 210/167 |
| 4,054,519 | 10/1977 | Tufts | 210/139 |
| 4,115,266 | 9/1978 | Ohshima | 210/500.1 |
| 4,131,959 | 1/1979 | Albertassi et al. | 4/319 |

OTHER PUBLICATIONS

*Federal Register*, Dept. of Transportation, Coast Guard, "Marine Sanitation Devices", Cert. Proc. and Design and Construction Requirements, Jan. 30, 1975, pp. 4622–4630.

*Primary Examiner*—Peter A. Hruskoci
*Attorney, Agent, or Firm*—Robert T. Gammons

[57] ABSTRACT

The method of treating human waste in a toilet system for disposal of the waste and recovery of the flushing liquid comprising reducing the solid matter in the effluent by hydraulic attrition in substantially one and a half liters of water containing an effective amount of decontaminant to a particle size which ranges from $\frac{1}{8}$ inch to $\frac{1}{2}$ micron and in which the solid matter in excess of 1/64 of an inch does not exceed more than 18% of the total solid matter, filtering the solid matter from the water and employing the filtered water following each flushing operation for a succeeding flushing of the system.

1 Claim, 14 Drawing Figures

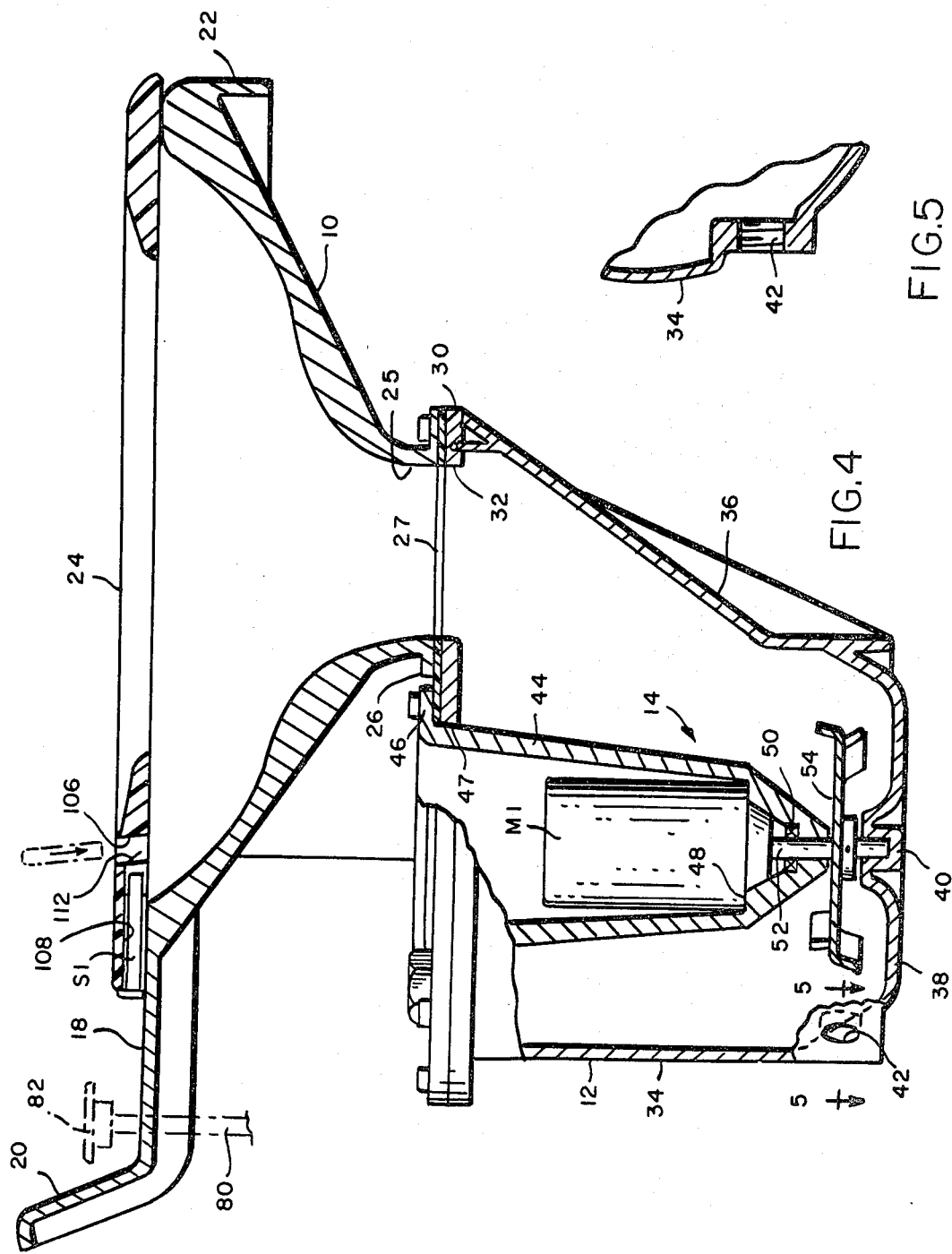

EFFLUENT TREATMENT IN A NON-POLLUTING TOILET SYSTEM

BACKGROUND OF THE INVENTION

This is a continuation of application Ser. No. 037,655 filed May 11, 1979, now abandoned and a continuation-in-part application of Ser. No. 939,992, filed Sept. 6, 1978, now abandoned.

In U.S. application Ser. No. 803,071, filed June 3, 1977, now U.S. Pat. No. 4,131,959, June 2, 1979, there is shown a non-polluting toilet system designed especially for marine purposes, but also useful for other purposes wherein there is a need to avoid pollution. The system described therein comprises essentially a toilet bowl, a treating chamber connected to the toilet bowl for receiving effluent flushed from the bowl, a macerator which operates in conjunction with the treating chamber to reduce the solid matter to acceptable particle size, that is, a size which will be sufficiently exposed to chemicals supplied to the flush bowl to render the effluent innocuous, and to pass the government test for acceptable particle size when the apparatus is used for marine purposes. In the aforesaid application, a single reversible pump is employed for inducing flush water into the system to flush the bowl and withdraw the treated effluent from the treating chamber so that the pump is self-cleaning and thus removes the unpleasant task of disassembling the pump which ordinarily withdraws the effluent from the treating chamber for cleaning purposes. The macerator and the treating tank embody the characteristics of applicants' U.S. Pat. No. 4,054,519, in that the macerator is provided with a specially constructed blade which, in conjunction with the internal configuration of the treating chamber, breaks up the solid matter by hydraulic attrition as contrasted to comminution. The instant invention constitutes an improvement on the apparatus of the aforesaid application and patent, while embodying the desirable characteristics thereof and, in particular, is designed to enable reducing the solid matter by hydraulic attrition to an acceptable size in a minimum quantity of flush water to a flowable, pumpable slurry and thereby conserve the use of water, in other words, a water saving toilet system that uses drastically less water than conventional systems; to provide for an improved valve means in the previous system wherein a single reversible pump was used; to provide alternate systems such as direct water supply into the bowl and a pump for removing treated effluent from the treating chamber; to enable using the system with twon or city water pressure thereby requiring only a discharge pump; and to enable employing a closed circuit system with a filter to enable recirculation of a predetermined amount of water.

The invention resides in a method of treating human waste (effluent) in a toilet system wherein a flushing liquid is employed to flush the effluent from a toilet bowl into a treating tank for disposal of the solid matter and recovery of the flush water comprising reducing the solid matter therein by hydraulic attrition to a slurry in a minimal quantity of flush water containing an efficient amount of decontaminant to a particle size which ranges from $\frac{1}{8}$ inch to $\frac{1}{2}$ micron and wherein the solid matter in excess of 1/64 of an inch does not exceed more than approximately 18% of the total solid matter. Desirably, no more than about $1\frac{1}{2}$ liters of flush water are used and preferably decontaminating tablets containing 60% to 95% of calcium hypochlorite by weight are used. The effluent is subjected according to the method to hydraulic attrition for approximately $2\frac{1}{2}$ minutes with a macerator blade of 3 to 7 inches in diameter rotating at approximately 5000 rpm. Desirably, the treated effluent slurry is passed through a filter bed which entrains sufficient of the residual solid matter so that the filtered fluid contains less than 200 mkg per liter. The filtered water is reused for successive flushing operations.

The invention will now be described in greater detail with reference to the accompanying drawings, wherein:

FIG. 4 is a vertical section taken on the line 4—4 of FIG. 1;

FIG. 5 is a fragmentary section taken on the line 5—5 of FIG. 4;

As herein illustrated, the method of reducing the solid matter to an acceptable particle size and recovering the water for reuse is carried out with the aid of the apparatus disclosed in the accompanying drawing.

Figure 6:
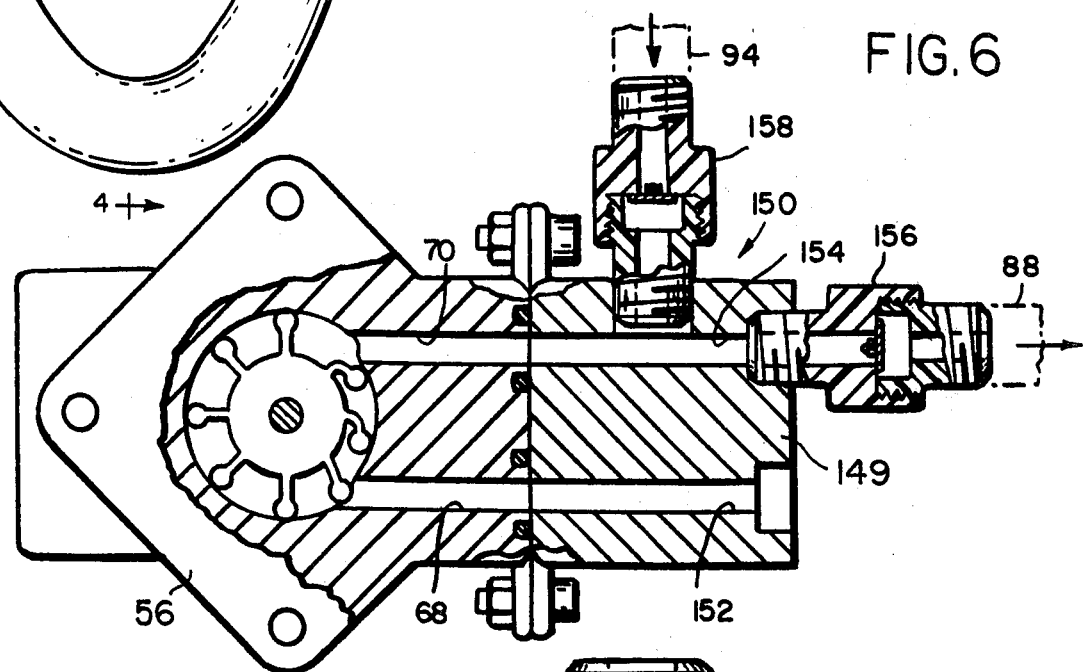
FIG. 6 is a plan view partly in section of the motor-driven pump and valve assembly.
Figure 8:
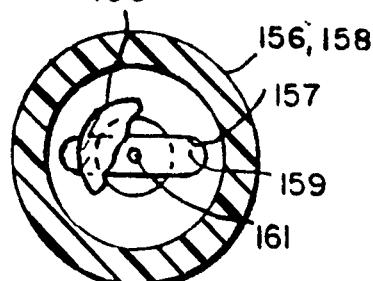
FIG. 8 is a section taken on the line 8—8 of FIG. 7.
Figure 7:
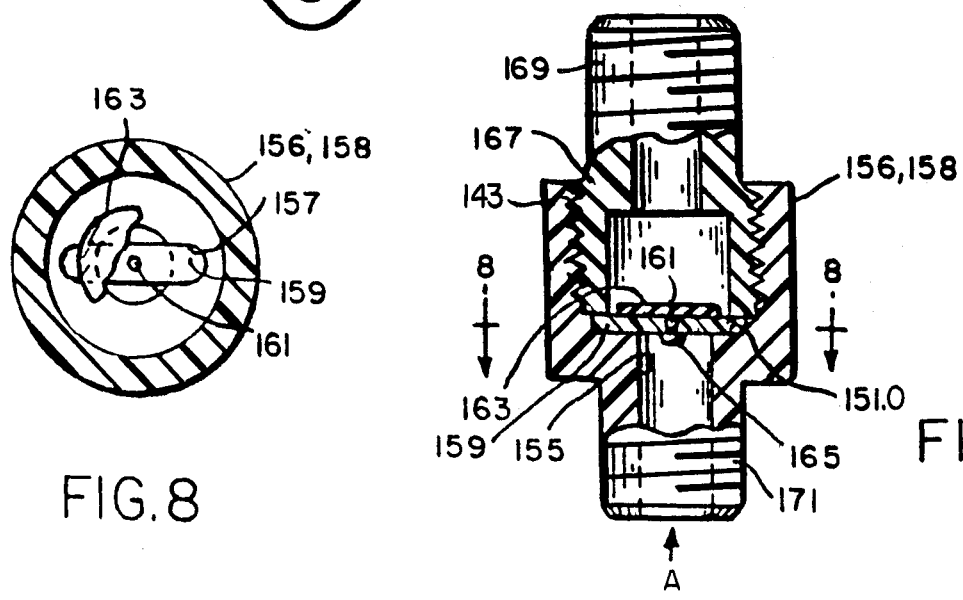
FIG. 7 is an elevation partly in section of one of the valve components of the valve assembly shown in FIG. 6.
Figure 2:
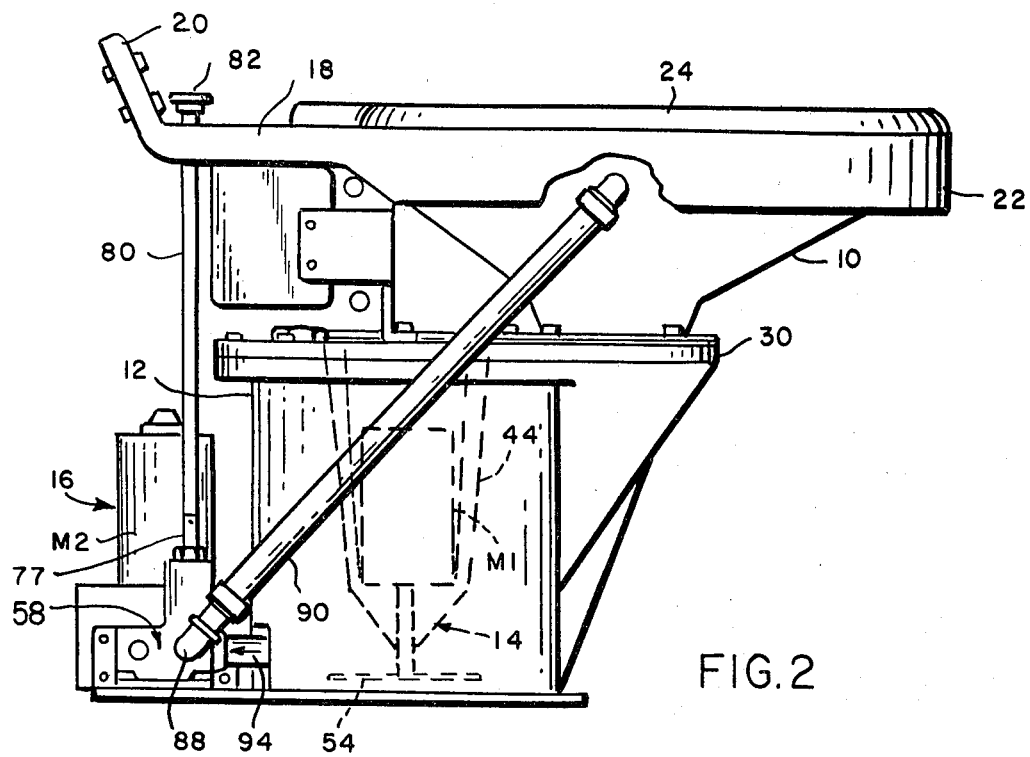
FIG. 2 is an elevation taken from the left-hand side of FIG. 1.
Figure 3:
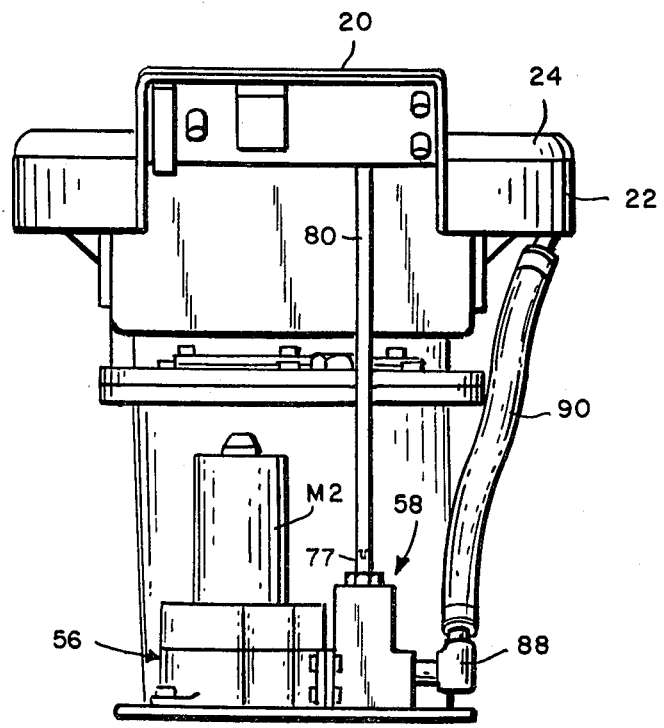
FIG. 3 is an elevation taken at the rear side of FIG. 1.

Referring to FIGS. 2 and 4, the toilet system as herein illustrated comprises in one form a bowl 10, a treating chamber 12 containing a macerator 14 and a combination pump and valve assembly 16, FIGS. 6, 7 and 8, connected by suitable plumbing to the bowl and to the treating chamber in such a way as to enable delivering flush water to the bowl for flushing the effluent therefrom into the treating chamber and, after maceration has been accomplished, discharging the effluent from the system.

Figure 1:
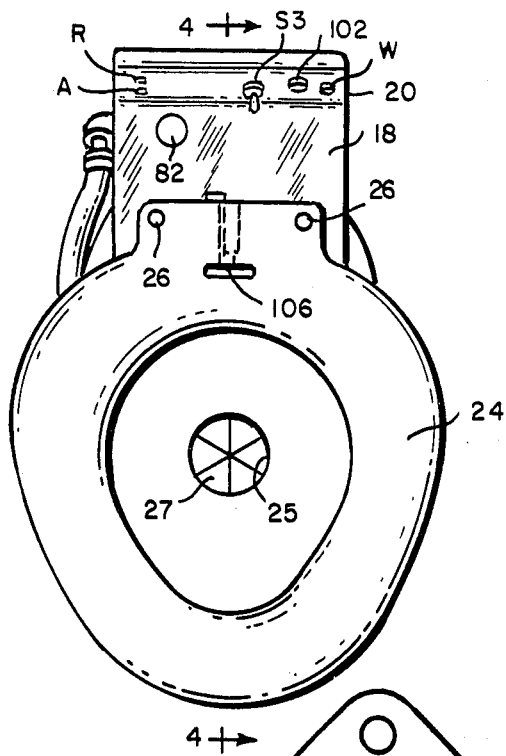
FIG. 1 is a plan view of the toilet structure.

The bowl 10 as shown in FIGS. 1 and 4 is of generally oval cross section and is provided at its rear end with an integral extension 18 and an upwardly inclined control panel 20 upon which are mounted switch means and indicators which enable conveniently initiating the flushing operation and/or the cleaning operation and of determining at any time the condition of the apparatus. The upper or rim of the bowl 10 is provided with a downturned skirt 22 which extends all the way around and along the opposite sides of the extension and the panel to afford an attractive appearance. A seat 24 is mounted atop the bowl in conventional fashion and is provided for this purpose at its rear end with transversely spaced holes 26—26 for receiving hinge means for pivotally connecting the seat to the bowl. The lower end of the bowl, FIG. 4, has a centrally located opening 25 defined by an annular flange 26.1 which seats against a cover plate 30 at the top of the treating chamber 12. The plate 30 contains an opening 32 through which the effluent can be flushed into the treating chamber. A combination gasket and splash guard 27 is provided between the bowl and the treating chamber to provide a watertight joint and to prevent splash of the effluent during maceration upwardly into the bowl.

The treating chamber 12 is of generally cylindrical cross section at the lower part, having a side wall 34, FIG. 4, which is generally perpendicular to the bottom, except for one side, the forward side, which has an upwardly and forwardly divergent wall 36. The bottom wall 38 is of annular configuration and has at its center a step bearing 40. Near the bottom, at the side substantially opposite the forwardly divergent wall 36, there is a discharge port 42, FIGS. 4 and 5. The annular, hemitoroidal shape at the bottom is like that in application Ser. No. 610,097, filed Sept. 4, 1975, for "HYDRAULIC ATTRITION UNIT FOR MARINE TOILETS", now U.S. Pat. No. 4,054,519, and provides in conjunction with the macerator blade an especially effective means for beating paper stock into its constituent fibers.

The macerator 14 is mounted within the treating chamber 12 in a housing 44, FIG. 4, provided with a flange 46 at its top by means of which it is attached to the cover plate 30 within an opening 47. The housing 44 is of sufficient size to receive the macerator motor M1 and is provided in its lower part with a horizontal bottom part 48 to which the motor housing can be bolted. The lower part also contains a central bearing 50 rotatably and sealably receiving the motor shaft 52, to the lower end of which is fixed the macerator blade 54. Desirably, the shaft 52 extends beyond the blade for engagement with the step bearing 40.

The macerator blade 54 is of the kind disclosed in the aforesaid U.S. Pat. No. 4,054,519, and as described therein is designed to effect maceration by causing impact of the particles of the effluent with each other rather than a shearing action such as is commonly used by others for effecting comminution of solid material. The specific reason for using a macerator of this kind rather than a shearing type of cutter is that the effluent contains a large proportion of paper which a shearing blade will not cut through, and which requires repeated pounding and recirculation to break it down into its constituent fibers. A cutting blade merely collects the fibers and becomes choked with the fibers so that its efficiency and effectiveness is reduced to uselessness in a very short period of time.

The combination pump and control valve assembly 16, FIGS. 6, 7 and 8, comprises, as shown, a motor-driven pump 56 and valve means 58. The valve means comprises a valve block 151 containing passages 152 and 154. Passage 152 is connected to the passage 68 of the reversible motor-driven pump and the passage 154 is connected to the passage 70 of the reversible motor-driven pump. The passage 154 is, in turn, connected by a check valve 156 to the conductor 88 which leads to the bowl and by a check valve 158 to the conductor 94 which leads to the treating tank. The check valves 156 and 158 are so arranged that when the pump is rotating in a direction to draw water into the passage 152 and force it through the passage 154, it will flow through the check valve 156 to the bowl, but will be prevented from entering the conductor 94. When the pump is driven in the opposite direction, the check valve 158 will permit the treated effluent to be withdrawn from the treating tank and discharged by way of the passage 154 and the passage 152, while the check valve 156 will prevent entry of the effluent into the conductor 188 to the bowl.

Referring to FIGS. 7 and 8, each check valve 156, 158, comprises a block 151 containing an internally threaded opening 153 partway through it and a smooth opening 155 of smaller diameter the restof the way through. At the junction of the opening 153 and the opening 155, there is an annular shoulder 151.0. The shoulder contains diametrically thereof a narrow slot 157 in which there is situated a rigid bar 159 containing a center hole 161. A flat, circular rubber disk 163 of larger diameter than the opening 155, but lesser diameter than the opening 153 is secured to the bar by a connector element 165 which is inserted through the center hole 161. A hollow externally threaded part 167 is screwed into the opening 153 against the end of the bar to hold the latter in place. As thus connected, the rubber disk will permit flow in the direction of the arrow A, but will prevent its flow in the opposite direction. The structure thus comprises a one-way check valve. Externally threaded nipples 169, 171 on the block 151 and the part 167 provide for coupling the check valves into the system.

It is not only necessary to macerate the effluent, but also to effect decontamination and deodorization and, of course, the greater the amount of maceration and, hence, reduction in particle size, the greater is the effectiveness of the decontaminant and/or deodorizer. A combination decontaminant and/or deodorizer is introduced into the system in suitable form, for example, the form of a tablet directly into the bowl and, for this purpose, there is provided, as shown in FIG. 4, at the rear side of the toilet seat, a slot 106 through which the tablet may be dropped. At the underside of the seat adjacent the opening 106, FIG. 4, there is a recess 108 within which there is mounted a switch assembly S1 provided at its forward end with an actuator finger 112 which extends into the opening 106 and, when deflected, by dropping the tablet through the slot 106, will complete a circuit through the switch to start the motor M1 of the macerator. Desirably, the switch-actuating finger 112 is set so that a predetermined force is required to effect its displacement and the tablets are made strong enough to effect such displacement so that a tablet not specifically made for this purpose will not actuate the switch and, hence, will not start the macerator. Tablets such as disclosed in U.S. Pat. No. 4,054,519 may be used deposited at each flushing. These tablets contain approximately 75% by weight of calcium hypochlorite. Alternately, much larger tablets may be used containing from 60% to 95% by weight of calcium hypochlorite and, when using these larger tablets, they are deposited directly into the treating chamber by dropping them into the bowl and will serve to render the effluent in several successive flushings innocuous. When the tablets are dropped directly into the bowl, the sensing switch is bypassed.

Instead of the switch S1, a sensing device of well-known kind such as a magnetic switch, photocells, proximity switch, microswitch, reed switch or the like may be used operable by, or in response to, the size, shape, hardness, color embossment of the bacteriacide. The bacteriacide itself may be a tablet, cartridge, capsule, powder or liquid.

It is within the scope of the invention to introduce the bacteriacide into the effluent prior to or after its maceration, for example, it may, as described above, be deposited in the bowl and flushed together with the effluent in the treating chamber, or it may be injected directly into the treating chamber, for example, by squirting a charge of bacteriacide directly into the treating chamber each time the bowl is flushed or the macerator is started. It is foreseen that a multiplicity of toilet systems such as described may be used in apartment-type dwelling units, might be connected by suitable plumbing to a common holding tank or discharge tank so that the macerated effluent from the entire building could be temporarily nheld, where, for example, there is not an available sewage system, and where, for example, it is not desirable to have individual holding tanks for each unit. Such a system would eliminate the responsibility of the individual to introduce the bacteriacide into the toilet, shifting the obligation to the building manager of some other responsible person, thus making it a more foolproof system of disposal without accidental contamination through the carelessness of individual users. The effluent so collected may be recoverable as a liquid or solid, for example, by evaporation of the liquid for soil conditioning purposes.

If it is desirable to remove the bulk paper fiber and solid waste from the treated effluent in a closed lump system to obtain substantially clear water, a filter may be used for this purpose as will be described hereinafter. If desired, an expendable filter unit may be employed which, when filled, can be removed and replaced by a new filter.

Since urine is sterile and contains no solid matter, operation of the macerator is not required, nor is it necessary to introduce a bacteriacide hence, the system may be flushed and discharged simply by flipping the starting switch S3 as will appear hereinafter first to the flush position and then to the discharge position. If the starting switch S3 were flipped to the flush position for flushing solid effluent without also starting the macerator motor, the system would instantly become inoperative since the conductor pipes and ports of the pump and valve are so small in diameter that they would not pass the effluent hence, no harm can come of actuating the toggle switch to effect discharge in the event the macerator has not been operated or has become inoperative. The conductor pipes and parts are, for this purpose, approximately 7/16 inches in diameter.

Figure 9:
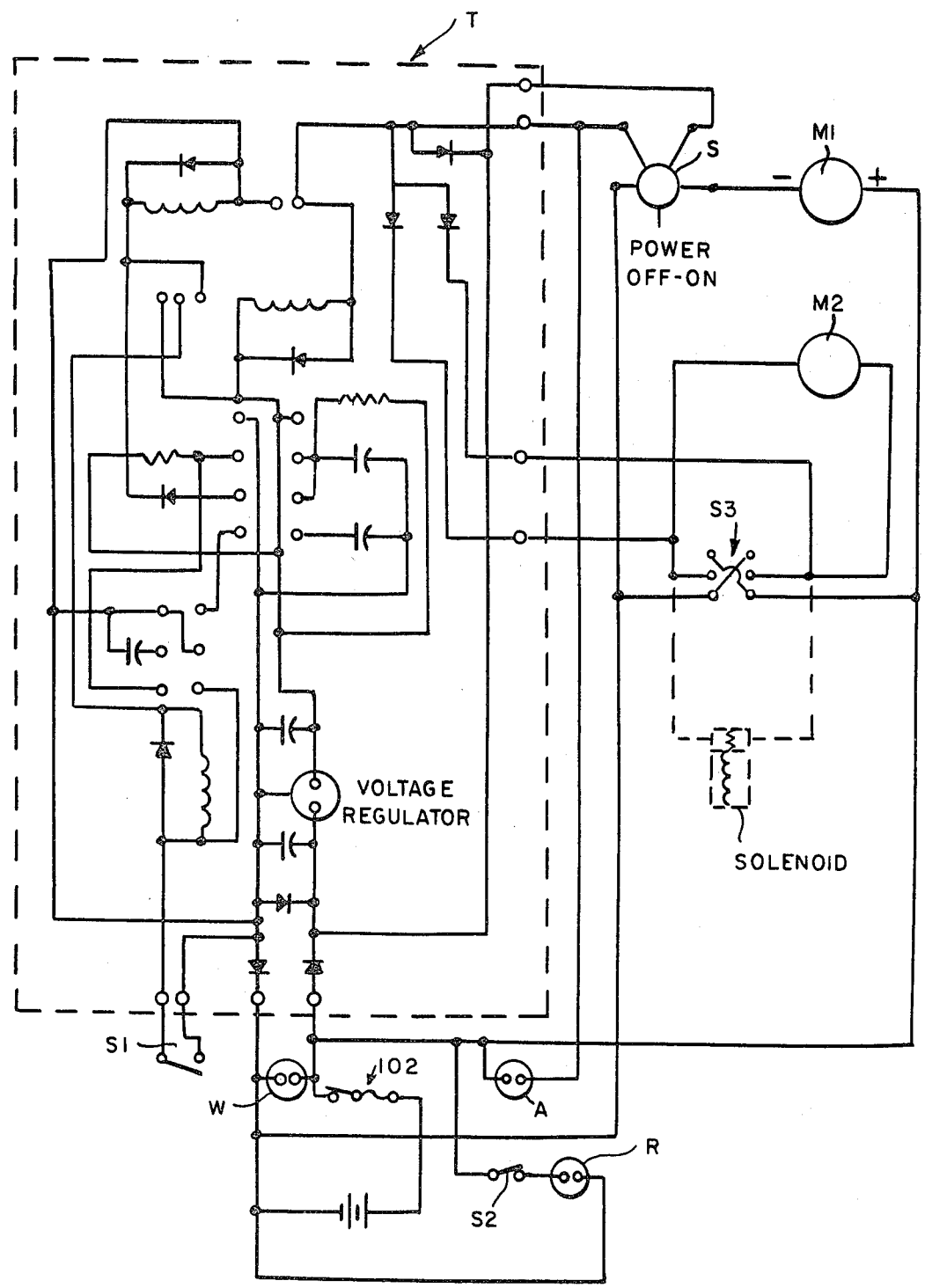
FIG. 9 is a wiring diagram of the control for operating the system.
Figure 10:
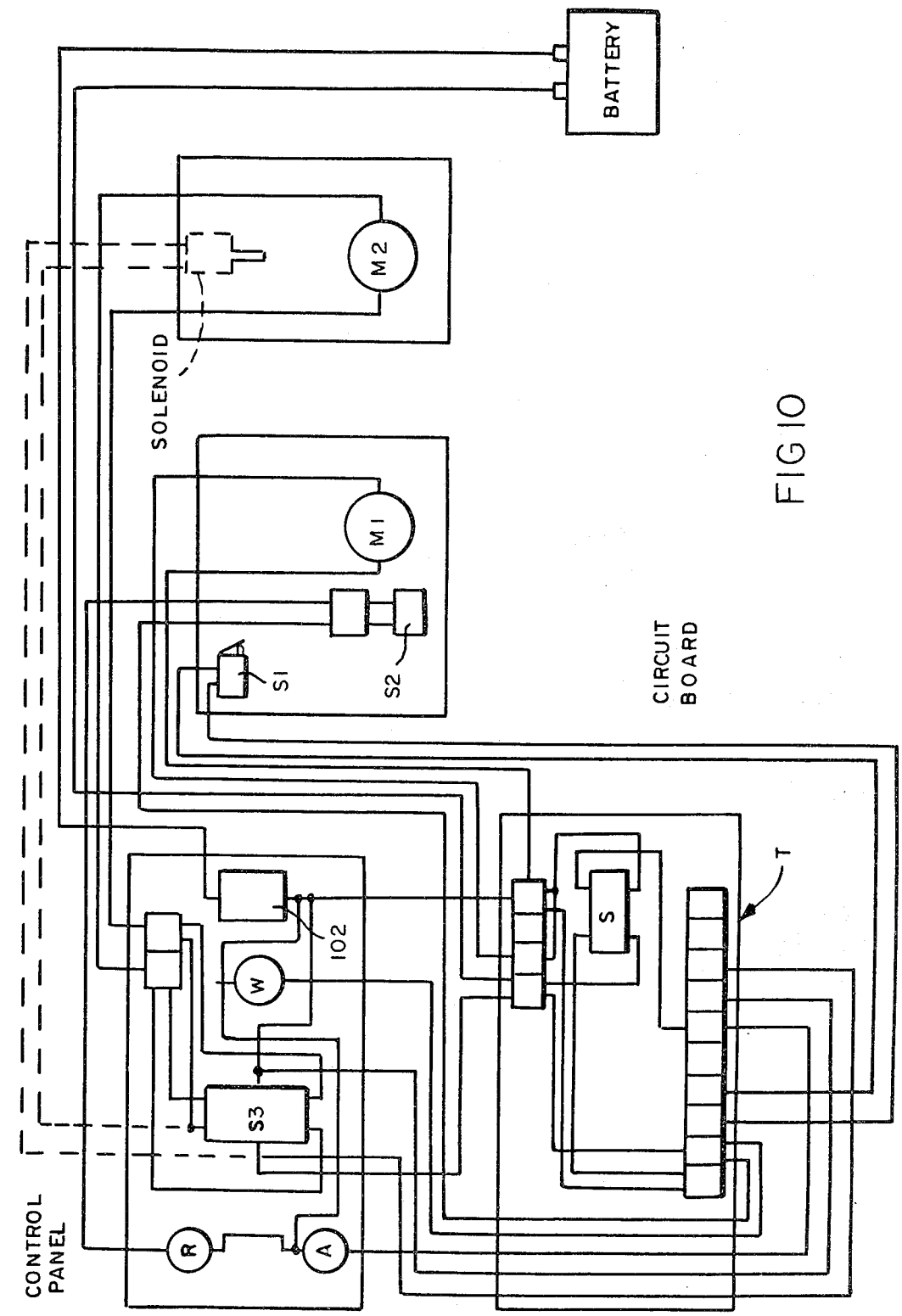
FIG. 10 is a block diagram of the control for operating the system.

The system may be controlled partly through manually operable switches and partly automatically. Referring to FIGS. 1, 9 and 10, there is mounted on the panel 20 a two-position switch S3 which, in one position, effects flushing and, in the other direction, discharge. Power is supplied to the system through a circuit breaker 102 and when the power is on, this fact is indicated by a white light W adjacent the circuit breaker. Optionally, the system may be entirely manual or entirely automatic.

The system is made ready for use by closing a master switch S as shown in FIGS. 9 and 10. Closing the switch S energizes the light W to indicate that the power is on. In order to flush the toilet, the toggle switch S3 is moved to a position to start the pump motor M2 and held in this position until the bowl is completely flushed into the treating chamber, whereupon it is moved back to its neutral position and the pump motor M2 stopped. After flushing, a tablet is forced through the slot 106 and, as it passes through, it actuates the switch S1 which starts the macerator motor M1. A timer T in the macerator circuit is adapted to be set to continue operation of the macerator for a predetermined time and then to stop the macerator motor. When the macerator motor M1 stops, the light A goes on. Following maceration, the toggle switch S3 is moved to a position to start the pump motor M2 in the opposite direction and held in this position until the treating chamber is empty, whereupon it is released and the motor M2 will stop. The circuit as thus arranged enables purging the system without operating the macerator by the simple expedient of holding the toggle switch in the first position to charge flush water into the treating tank and then holding it in said second position to cause the water to be pumped out of the treating chamber.

As previously related, instead of dropping a tablet in for each flushing, a large tablet may be dropped directly into the treating tank and, when this is done, the switch S1 is bypassed and the macerator motor M1 is started when the pump motor M2 is stopped.

The system as described above is essentially of great simplicity as compared with most systems designed for the same purpose and is particularly attractive for the reason that its design frees the system from residual accumulations which may become the source of deposits within the system. This is provided by the reversible pump which is self-cleaning in operation. Efficiency in operation is achieved by disabling the macerator during the purging of the system. Further, as previously indicated, the macerator itself is especially effective in breaking up the solid material to a fineness to promote maximum decontamination and deodorization and the fact that the configuration of the macerating chamber and its isolation from the pump provides both ideal and maximum exposure of the effluent to the macerator.

Figure 11:
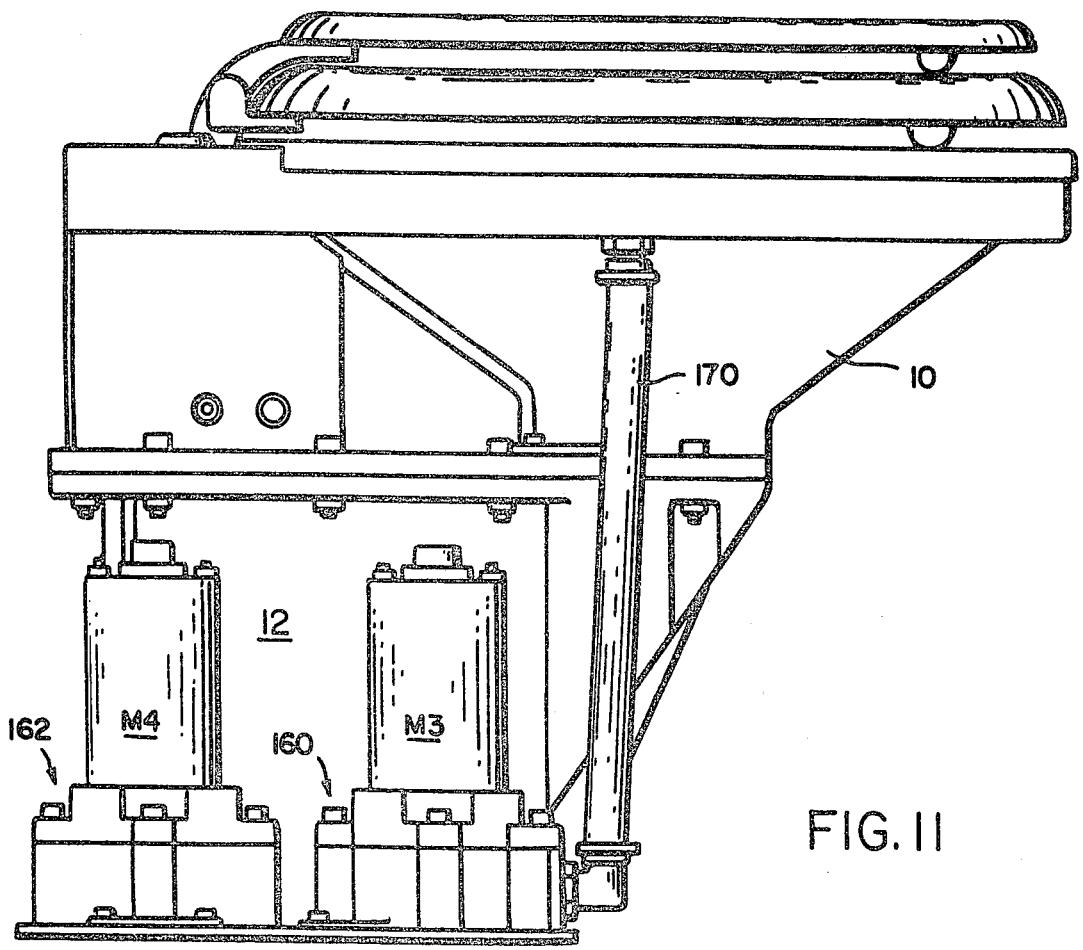
FIG. 11 is an elevation of an alternative toilet structure wherein two-motor driven pumps are used.
Figure 12:
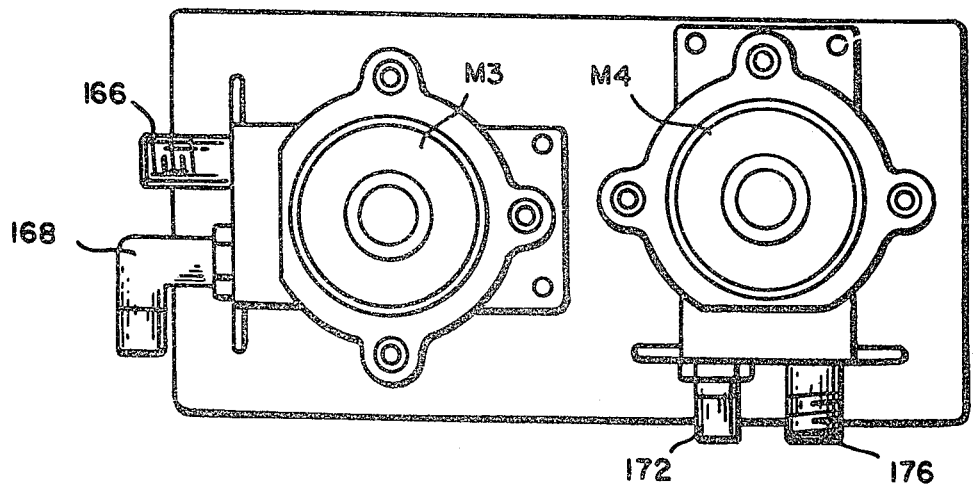
FIG. 12 is a plan view of the two motor-driven pumps.

An alternative toilet system is shown in FIGS. 11 and 12 wherein two motor-driven pumps 160 and 162 are used provided with motors M3 and M4. The motor-driven pump 160 as shown in FIG. 12 is provided with a fitting 166 for taking water into the system and a fitting 168 for receiving one end of a conductor 170, the other end of which is connected to the bowl 10. The pump 162 is provided with a fitting 172 which is connected by a conductor not shown to the treating tank 12 and a fitting 176 for connection to a discharge line not shown.

Figure 13:
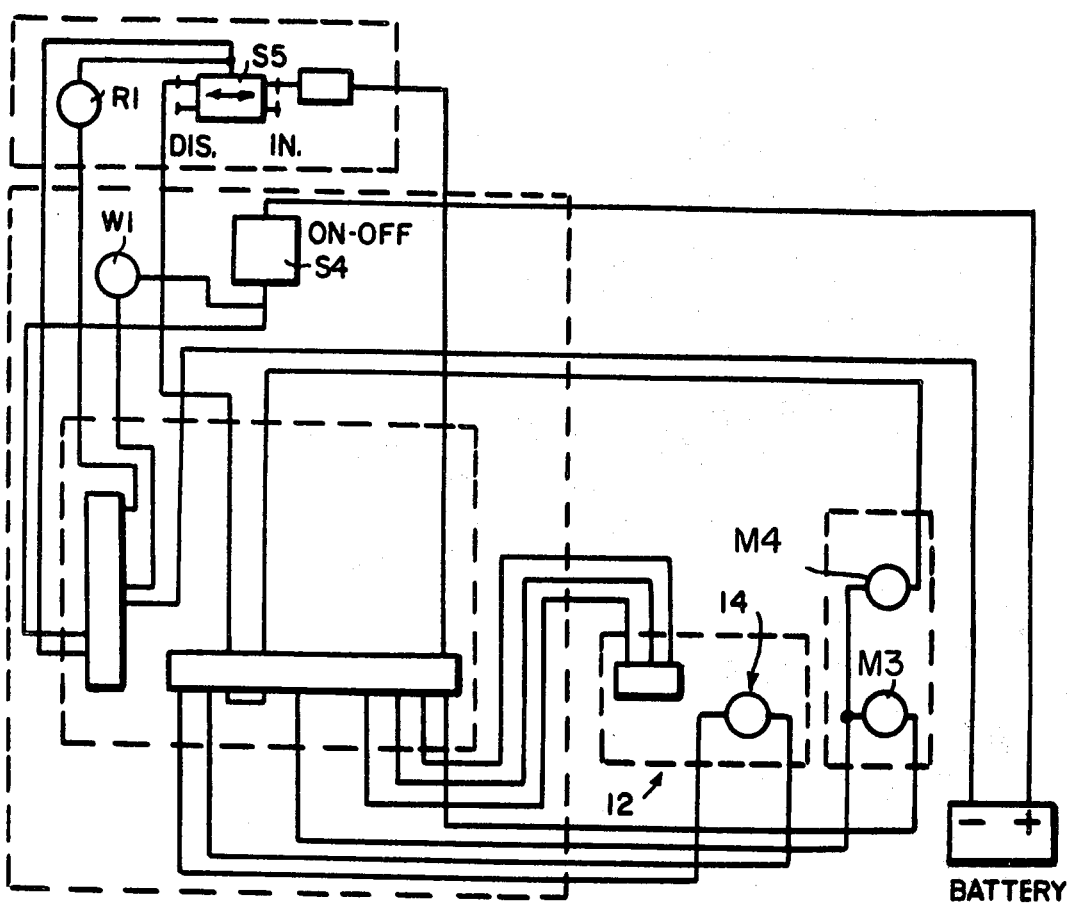
FIG. 13 is a block diagram of the control when using two pumps.

The control circuit for the two-pump system is illustrated in FIG. 13 wherein there is a combination on/off circuit breaker switch S4 which, when placed in an on position, connects the circuit to a source of power comprising a battery so labeled. When the switch S4 is placed in the on position, a white light W1 is turned on to indicate that the power is on. A starting switch S5 in the circuit provides for, in one position, starting the motor M3 and its associated pump 160 to take water into the system and deliver it to the bowl for flushing. As in the previously described system, when the effluent has been flushed into the treating tank, the macerator 14 therein is started by forcing a tablet through the slot provided for this purpose, whereupon the macerator runs for a predetermined period soas to effect complete maceration of the solid matter. During operation of the macerator, a light R1 in the circuit is turned on to show that the macerator is running. When the macerator motor stops, the light is extinguished, whereupon the switch S5 is moved in the other direction to the discharge position soas to start the motor M4 of the discharge pump 162 and thus discharge the treated effluent from the treating chamber to the discharge line.

Figure 14:
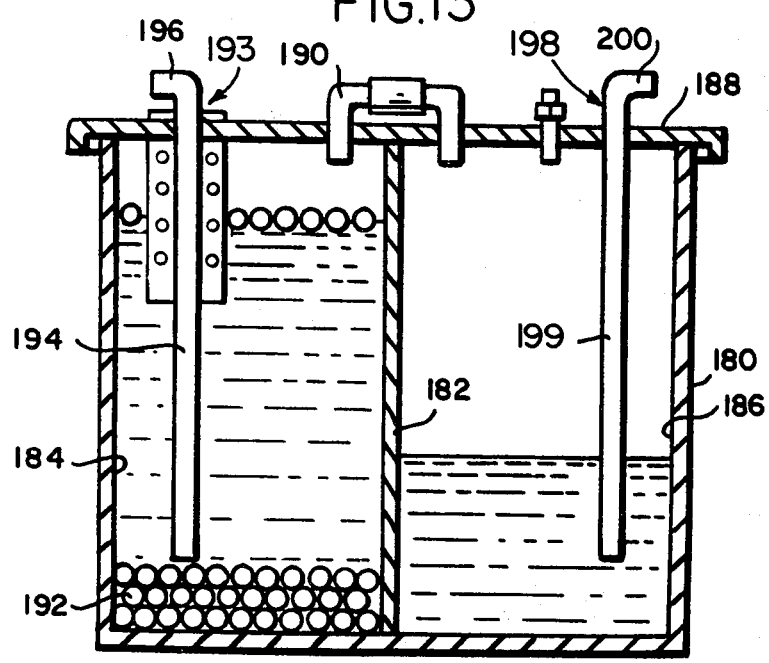
FIG. 14 is an elevation of a filtering unit for use in connecting the system to a closed circuit.

There are situations where there are restrictions on the amount of water that is available and restrictions as to discharge and, for this reason, the system may be provided with a filtering unit as shown in FIG. 14 and the system closed. The filtering unit comprises a tank 180 divided by a partition 182 into two chambers 184 and 186. The chambers 184 and 186 are closed at the top by a cover 188 and are interconnected at the top by a cover 188 and are interconnected at the top by a conductor 190. The chamber 184 8s filled with particulate material 192 which may be generally spherical in shape and which may be all of the same size or of different sizes. The particles 192 are buoyant and so will float on fluid delivered into the chamber 184. These particles may be made of plastic and, desirably, have a somewhat roughened surface. A conductor 193 is mounted to the cover 188 with a portion 194 extending into the chamber 184 to a position close to the bottom. The upper projecting end 196 of the conductor 193 is connected to the discharge side of the pump 164 so that the macerated effluent withdrawn from the treating chamber is delivered into the chamber 184 near the bottom. As the effluent rises in the chamber 184, the solid matter in the macerated effluent and particularly the fibers are entrained by the particulate material so that the liquid at the top is substantially free of any solid matter. The filtering particles are sufficiently effective so that the water is substantially clear at the top of the chamber 184 and this clear water flows by way of the conductor 190 into the chamber 186. A conductor 198 is mounted to the cover 188 with a portion 199 extending down to near the bottom of the chamber 186 for withdrawing the clear water from the filter tank and returning it to the system for flushing. The upper end 200 of the conductor 198 is connected to the intake side of the pump 160. Thus, there is provided a closed system wherein a predetermined quantity of water is circulated by the pump through the filter tank where the solid matter macerated by the macerator is trapped. The filter tank may be periodically cleaned either by removing the cover 188 and dumping out the filtering particles and replacing them or a drain valve may be provided at the bottom of the chamber 184 so that fresh water may be flushed through the bed of particulate material from the top to the bottom to clean the particulate material. Alternatively, as previously mentioned, the filter unit may be made of such inexpensive material, for example, plastic, as to be expendable. When using a closed system, it is desirable to include in the tablets a deodorant and die.

As described hereinbefore, the flush water has been drawn into the system for flushing the bowl by a motor-driven pump and, for marine purpose, where the clean water which is to be used for the system is sea water, a pump is essential. It is very possible and contemplated within the scope of the invention to use the system in areas where the local water pressure is sufficient to supply water to the system without having to pump it and, accordingly, it is contemplated that the motor-driven intake pump 160 may be dispensed with and the conductor 170 connected directly to a domestic water pipe with valves for shutting off the supply when a sufficient amount of water has been delivered to effect flushing.

An important aspect of the invention resides in the fact that the apparatus as described in its several forms enables comminuting the solid matter in each flushing with between 1 to 3 liters of water, and, in most instances, no more than 1½ liters of water, thus making it extremely valuable for installation where very little water is available and the further fact that with this small quantity of water as compared to the conventional quantity required (20 liters), the solid matter can be reduced to a pumpable slurry wherein the solid matter exists in a range of from $\frac{1}{8}$ inch to $\frac{1}{2}$ micron size and wherein the particle size within the range comprises approximately 1% of $\frac{1}{8}''$, 3% 1/16", 5% 1/32, 10% 1/64" and the remainder from 1/64" to $\frac{1}{2}$ micron. This is achieved by means of the hydraulic attrition afforded by the macerator and can be accomplished in approximately 2½ minutes at a rotation of 5,000 rpm of the macerator using a rotor of from 1½ to 3½ inches in radius. For best bacteria kill 2½ minutes, but for pumpable slurry 10 to 15 seconds suffices. Another aspect of the invention resides in the fact that the filter effectively removes the comminuted solid particles successfully enough so that the fluid at the top of the filter bed contains less than 200 mkg solid matter per liter. Following the practice of the invention as herein related, the bacteria count may be reduced below the federal requirements and to as little as 0 to 50 coliform bacteria count per 100 ml by using 20 gram tablets containing 60% to 95% by weight calcium hypochlorite.

It should be understood that the present disclosure is for the purpose of illustration only and includes all modifications or improvements which fall within the scope of the appended claims.

What is claimed is:

1. The method of treating human waste effluent solid matter in a toilet system wherein there is a bowl for receiving a deposit of effluent, a pump for delivering flush water to the bowl to effect flushing and a treating tank containing a hydraulic attrition device for receiving effluent and flush water from the bowl, the method comprising, with the aid of the pump, delivering 1½ liters of flush water to the bowl to flush the effluent from the bowl into the treating tank and, with the aid of the hydraulic attrition device in the form of a rotating blade having a blade diameter of 3 to 7 inches, rotated at 5000 rpm for 2½ minutes, reducing the solids in the effluent by hydraulic attrition in contrast to maceration to a particle size which ranges from $\frac{1}{8}$ inch to $\frac{1}{2}$ microns and in which the solid matter in excess of 1/64 of an inch does not exceed more than 18% of the total solid matter, adding a decontaminant to the treating tank during hydraulic attrition to effect decontamination in the form of a 20 gram tablet containing 60% to 95% by weight of calcium hypochlorite and passing said effluent through an upflow filter containing a bed of buoyant particulate material, to separate the solids from the effluent.

* * * * *

UNITED STATES PATENT AND TRADEMARK OFFICE
CERTIFICATE OF CORRECTION

PATENT NO. : 4,347,142
DATED : August 31, 1982
INVENTOR(S) : James H. Albertassi et al It is certified that error appears in the above-identified patent and that said Letters Patent are hereby corrected as shown below:

Column 8, line 38, after "effluent" insert --containing--

Signed and Sealed this

Second Day of November 1982

[SEAL]

Attest:

GERALD J. MOSSINGHOFF

Attesting Officer          Commissioner of Patents and Trademarks